United States Patent
Kihara et al.

(10) Patent No.: US 6,277,282 B1
(45) Date of Patent: *Aug. 21, 2001

(54) REVERSE OSMOSIS ELEMENT UTILIZING A FABRIC COMPOSED OF SUBSTANTIALLY ORIENTED FIBERS

(75) Inventors: Masahiro Kihara; Hiroyuki Yamamura, both of Otsu; Kazuhiko Nishimura, Yokaichi, all of (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,799

(22) Filed: May 28, 1998

(51) Int. Cl.[7] .............................. B01D 61/02; B01D 61/08
(52) U.S. Cl. ................ 210/652; 210/493.4; 210/321.74; 210/321.83
(58) Field of Search ............... 210/247, 321.74, 210/321.75, 321.76, 321.83, 321.84, 321.85, 652, 493.4; 442/366

(56) References Cited

U.S. PATENT DOCUMENTS

| | | | |
|---|---|---|---|
| 3,705,070 | * | 12/1972 | Kim . |
| 3,813,334 | * | 5/1974 | Bray ................................ 210/321.83 |
| 3,993,566 | * | 11/1976 | Goldberg et al. ............... 210/321.84 |
| 5,154,832 | * | 10/1992 | Yamamura et al. ................. 210/640 |
| 5,804,280 | * | 9/1998 | Pall et al. ............................. 428/137 |

FOREIGN PATENT DOCUMENTS

| | | |
|---|---|---|
| 54-31087 | * 3/1979 | (JP) . |
| 9-141067 | 6/1997 | (JP) . |
| 96/09879 | * 4/1996 | (WO) . |

OTHER PUBLICATIONS

Reemay, Inc. Company Internet Website, Aug. 2000.*

* cited by examiner

Primary Examiner—Ana Fortuna
Assistant Examiner—Richard W. Ward
(74) Attorney, Agent, or Firm—Schnader Harrison Segal & Lewis LLP

(57) ABSTRACT

A reverse osmosis membrane element is provided that can treat a raw liquid throughout a wide raw liquid pressure range from a low pressure to a high pressure, comprising a reverse osmosis membrane, a permeated liquid passage conduit provided on one surface of the reverse osmosis membrane, and arranged to face it, and a water permeable fabric provided between the reverse osmosis membrane and the permeated liquid passage conduit; it is preferable that the water permeable fabric has an average surface roughness of 2–2 µm, that is has a pure water permeation coefficient of 0.5–5.0 m$^3$/(m$^2$.MPa.min) and that it is a nonwoven fabric.

24 Claims, 3 Drawing Sheets

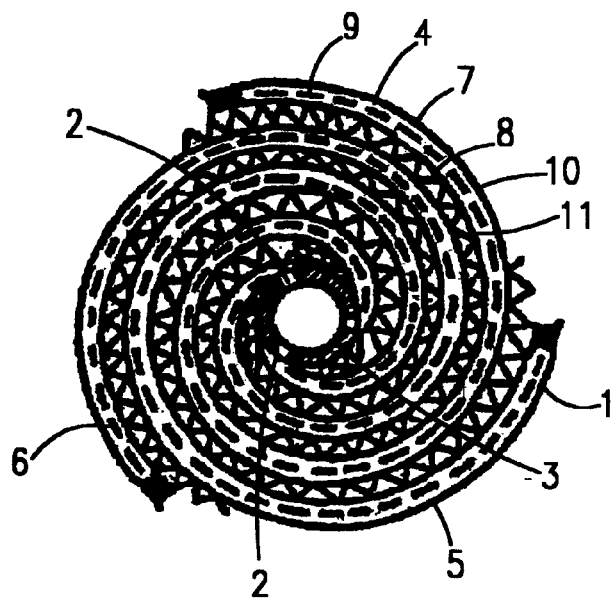
Fig. 1
CONVENTIONAL

CONVENTIONAL
*Fig.3*
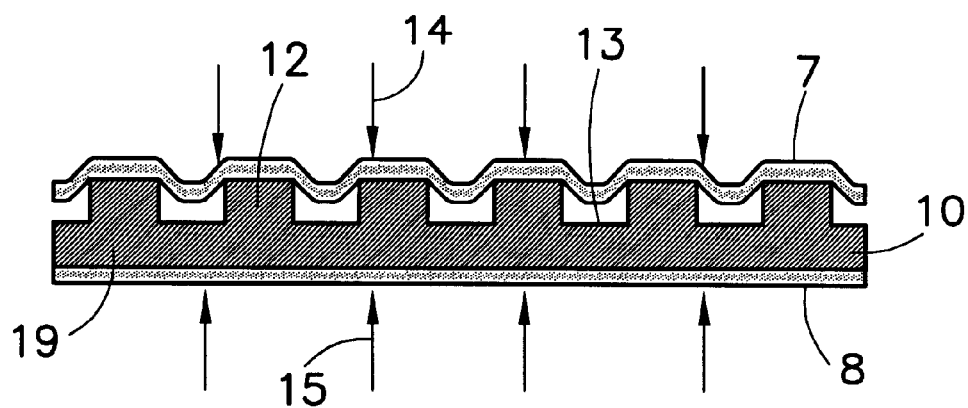
CONVENTIONAL

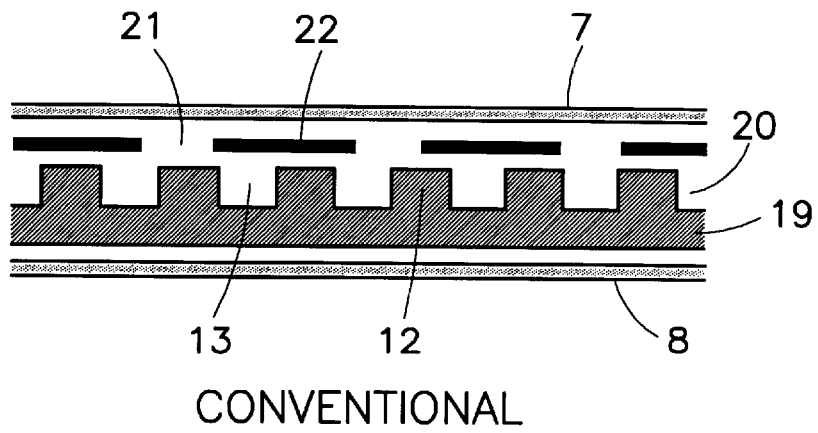
Fig. 4
CONVENTIONAL

REVERSE OSMOSIS ELEMENT UTILIZING A FABRIC COMPOSED OF SUBSTANTIALLY ORIENTED FIBERS

FIELD OF THE INVENTION

The present invention relates to an improved reverse osmosis membrane element capable of separating and concentrating various liquids, a reverse osmosis membrane apparatus using said reverse osmosis element, and a method for producing a separated liquid using said apparatus. The improved reverse osmosis membrane element of the present invention allows the treatment of a raw liquid throughout a wide pressure range from a low pressure to a high pressure without lowering the performance of the reverse osmosis membranes. The reverse osmosis element has good pressure resistance and durability.

DESCRIPTION OF THE PRIOR ARTS

Reverse osmosis membrane apparatuses used for separating or concentrating a desired component of a liquid include a spiral type apparatus in which reverse osmosis membranes are spirally wound and this overlaid on themselves with predetermined clearances kept between them, a plate and frame type in which a plurality of reverse osmosis membranes are overlaid over each other with predetermined clearances kept between them, and a hollow fiber bundle type apparatus in which hollow fibers formed of reverse osmosis membranes are bundled with predetermined clearances kept between them.

Among these, especially spiral type reverse osmosis membrane arrangements are most popularly used, since reverse osmosis membranes with a large membrane area can be packed in a limited volume.

Referring to the general structure of a spiral reverse osmosis membrane apparatus, one module is used in which a liquid passage conduit for permeated liquid is installed between two reverse osmosis membranes while a supplied liquid passage conduit is installed outside either of the reverse osmosis membranes and is wound and overlaid a plurality of times around a liquid collecting pipe, which is a hollow pipe provided with liquid collecting holes. This structure will be explained later again in reference to FIGS. 1 and 2.

Usually such a reverse osmosis membrane apparatus is used with a differential pressure of about 0.5 to 7 MPa kept working between the supply liquid side and the permeated liquid side for efficient liquid separation or concentration. At the working pressure, the permeated liquid passage conduit is required to support the reverse osmosis membranes without impairing the performance of the reverse osmosis membranes and to enhance the passage of the permeated liquid.

For this reason, as a permeated liquid passage conduit of a reverse osmosis membrane apparatus used at a relatively low pressure, for example as proposed in Japanese Patent Laid-Open (Kokai) No. 62-35802, a knitted single tricot fabric, made rigid by resin impregnation or heat fusion, is used. The knitted single tricot fabric has a plurality of grooves formed at certain intervals on the surface of one side of the fabric. The grooves form the main channels the passage that delivers of the permeated liquid.

In most of the presently practically used spiral configuration reverse osmosis membrane apparatuses, a knitted single tricot fabric is used to retain the shape of the permeated liquid passage. In this case, as a means to reduce the resistance to the flow of the permeated liquid, the grooves are as wide as about 300 to 600 µm, serving to to widen the permeated liquid passage area.

However, since this groove width is large for the usually used reverse osmosis membrane with a thickness of 200 to 300 µm, it happens that the reverse osmosis membrane is often deformed and caused to be depressed at the grooves blocking the permeated liquid passage when pressure is applied. The conventional spiral reverse osmosis membrane apparatuses cannot avoid the deformation of reverse osmosis membranes and are likely to decline in performance including the flow rate of the permeated liquid, the rejection of the intended substance and the concentration rate.

When the rigidity of a reverse osmosis membrane is not so high, it may be deformed at a relatively low pressure, and in the long run, performance declines even at a pressure of about 1 MPa to 2 MPa. Especially in such applications as sea water desalination and food concentration and separation where a high pressure must be applied, it is found difficult to use such an apparatus. The deformation of a reverse osmosis membrane is described later again in reference to FIG. 3.

In a reverse osmosis membrane apparatus, to improve performance such as the flow rate of the permeated liquid, the rejection of any intended substance and the concentration rate, it is desired that the reverse osmosis membrane shell be deformed less at the pressure exerted by the raw liquid, and that the permeated liquid flow resistance by the permeated liquid passage conduit is kept small.

As a method for satisfying the requirement, Japanese Patent Laid-Open (Kokai) No. 54-31087 proposes a reverse osmosis membrane element used at a high pressure in which a 70 to 400 µm thick perforated polyester sheet having small holes of 50 to 1000 µm in diameter at about 0.1 to 200 mm intervals is provided between the reverse osmosis membrane and the grooved surface of the knitted single tricot fabric, to prevent the deformation of the reverse osmosis membrane at a high pressure for lessening the permeated liquid flow resistance. The structure will be described later again in reference to FIG. 4.

If a perforated sheet is provided on the grooved surface of the knitted single tricot fabric, the rigidity of the perforated sheet prevents that depression of the reverse osmosis membrane at the grooves, for preventing the increase of the permeated liquid flow resistance in the permeated liquid passage formed by the grooves.

However, since the permeation area is restricted by the small holes of the perforated sheet when the permeated liquid passes through the perforated sheet, the permeation resistance increases to several to ten-odd times compared to a case without using any perforated sheet, and causes pressure loss, and at a low working pressure, the performance of the reverse osmosis membrane cannot be sufficiently manifested.

To decrease the liquid permeation resistance of the perforated sheet, it is necessary to increase the diameter of the small holes formed in the perforated sheet or to decrease the hole intervals for increasing the number of small holes. However, if the diameter of small holes is larger than the thickness of the reverse osmosis membrane, the reverse osmosis membrane is depressed into the small holes at a high pressure, and is damaged, declining in performance disadvantageously.

On the contrary, if the diameter of the small holes is kept smaller than the thickness of the reverse osmosis membrane, to prevent the depression of the reverse osmosis membrane into the small holes, the liquid permeation resistance acting when the liquid passes through the small holes becomes extremely large, in approximate inverse proportion to the 4th power of the diameter of the small holes. To inhibit the increase of permeation resistance, a very large number of small holes is necessary, making the production of the perforated sheet very difficult., and at the same time, the rigidity of the perforated sheet itself is lowered by the increase of small holes, making it difficult to obtain stable performance.

The reverse osmosis membrane element proposed in said Japanese Patent Laid-Open (Kokai) No. 54-31087 has these problems, and any a reverse osmosis membrane element which can be used stably at a high pressure is not developed yet.

A reverse osmosis membrane usually consists of three layers; a substrate formed of a fabric such as taffeta or nonwoven fabric, a porous supporting layer formed on it by a polymer such as a polysulfone or polyacrylonitrile, and a separation layer capable of separating a liquid formed on it. If the fabric used as the substrate is made thicker to prevent the deformation of the reverse osmosis membrane, the deformation can be prevented, and the reverse osmosis membrane is less likely to be damaged. However, since the fabric is thick, it lowers the porous supporting layer formability on the fabric, and the reverse osmosis membrane becomes more rigid, making it difficult to wind the produced reverse osmosis membrane spirally.

As described above, if the conventional permeated liquid passage conduit is used, it is difficult to make a reverse osmosis membrane element which can achieve sufficient performance throughout a wide working pressure range from a low pressure to a high pressure.

SUMMARY OF THE INVENTION

The object of the present invention is to solve the above mentioned problems by providing a reverse osmosis membrane element having excellent pressure resistance and durability without being reduced in performance factors such as the flow rate of the permeated liquid, the rejection of any intended substance and the concentration rate, throughout a wide pressure range from a low pressure to a high pressure.

The present invention, achieving the above object, is described below.

The reverse osmosis membrane element of the present invention comprises a reverse osmosis membrane, a permeated liquid passage conduit provided on one surface of the reverse osmosis membrane and arranged, to face it, and a water permeable fabric provided between the reverse osmosis membrane and the permeated liquid passage conduit.

It is preferable that the water permeable fabric has an average surface roughness (Rz) of 20 $\mu$m or less. It is preferable that the average surface roughness (Rz) is 2 $\mu$m or more.

It is preferable that the water permeable fabric has a pure water permeability coefficient of 0.5 $m^3/(m^2.MPa.min)$ or more at 25° C. It is preferable that the pure water permeability coefficient is 5.0 $m^3/(m^2.MPa.min)$ or less.

It is more preferable that the pure water permeability coefficient is 1.0 $m^3/(m^2.MPa.min)$ or more at 25° C. It is more preferable that the pure water permeability coefficient is 4.0 $m^3/(m^2.MPa.min)$ or less.

It is preferable that the water permeable fabric is a nonwoven fabric.

It is preferable that the nonwoven fabric is composed of many single filaments oriented substantially in a certain direction. It is preferable that the single filaments have a thickness of several microns each and a length of several millimeters to tens of millimeters.

A nonwoven fabric composed of many single filaments oriented substantially in a certain direction can be produced by continuously taking many single filaments dispersed in a liquid by a wire cloth while orienting them substantially in a certain direction, and winding them as a roll.

The many single filaments of the nonwoven fabric can be visually observed to be oriented in the rolling direction. However, it can be observed by a microscope that the adjacent single filaments are entangled with each other. The strength of the nonwoven fabric in the direction parallel to the direction of oriented single filaments is substantially about 3 to 5 times that in the direction perpendicular to it.

It is preferable that the permeated liquid passage conduit of the reverse osmosis membrane element of the present invention has grooves on the surface to form the conduit and that the nonwoven fabric is provided between the reverse osmosis membrane and the permeated liquid passage conduit in such a manner that the direction of the oriented filaments of the nonwoven fabric is substantially perpendicular to the direction of the grooves.

The reverse osmosis membrane unit of the present invention also comprises the combination of the reverse osmosis membrane element of the present invention, another reverse osmosis membrane (second reverse osmosis membrane) provided on the opposite side of the permeated liquid passage conduit of the element, opposite to the side where the first reverse osmosis membrane is located.

The reverse osmosis membrane module of the present invention comprises the reverse osmosis membrane unit of the present invention together with a liquid passage conduit carrying supplied or raw liquid provided outside either the first reverse osmosis membrane or the second reverse osmosis membrane of the unit.

The reverse osmosis membrane apparatus of the present invention also comprises the reverse osmosis membrane module of the present invention, provided with a liquid collecting pipe with many through holes formed through its circumferential surface to its inside surface. The reverse osmosis membrane module is wound and thereby overlaid on itself around the surface of the liquid collecting pipe in such a manner that the permeated liquid passage conduit may communicate with the holes of the liquid collecting pipe to deliver the permeated liquid.

The method for producing a separated liquid using the reverse osmosis membrane apparatus of the present invention is characterized in that the incoming liquid flows in the supplied liquid passage formed by said supplied liquid passage conduit, that the liquid passing through the reverse osmosis membranes flows in the permeated liquid passage conduit, and that the feed liquid is gradually concentrated in said supplied liquid passage.

The method for producing a separated liquid can be especially preferably used when the raw incoming liquid is sea water.

BRIEF DESCRIPTION OF THE DRAWINGS

FIG. 1 is a schematic transverse sectional view showing a spiral reverse osmosis membrane apparatus using conventional reverse osmosis membranes.

FIG. 3 is a schematic vertical sectional view showing the deformation of a reverse osmosis membrane caused at a high pressure in the conventional reverse osmosis membrane unit shown in FIG. 2.

FIG. 4 is a schematic vertical sectional view showing a conventional reverse osmosis membrane unit used at a high pressure.

DESCRIPTION OF THE PREFERRED EMBODIMENTS

Figure 2:
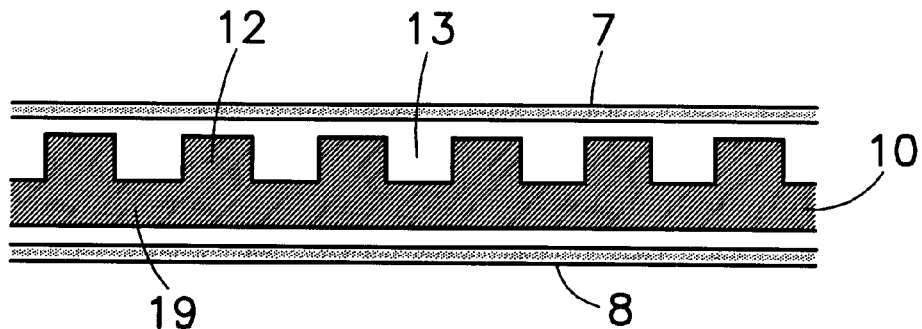
FIG. 2 is a schematic vertical sectional view showing a conventional reverse osmosis membrane unit in which a permeated liquid passage conduit made from a single tricot is used.

FIG. 1 is a schematic transverse sectional view showing a spiral reverse osmosis membrane apparatus using conventional reverse osmosis membranes. In FIG. 1, a reverse osmosis membrane apparatus 1 is composed of a treated liquid collecting pipe 3 with many through holes 2 formed from its circumferential surface to the inside surface, and three reverse osmosis membrane modules 4, 5 and 6. The reverse osmosis membrane module 4 consists of a reverse osmosis membrane unit 10 consisting of a first reverse osmosis membrane 7, a second reverse osmosis membrane 8 and a permeated liquid passage conduit 9, and a supplied liquid passage conduit 11. The other reverse osmosis membrane modules 5 and 6 also have the same structure. The permeated liquid passage conduit 9 is provided between the first reverse osmosis membrane 7 and the second reverse osmosis membrane 8, and the supplied liquid passage conduit 11 is provided outside the second reverse osmosis membrane 8. The respective reverse osmosis membrane modules 4, 5 and 6 are wound and overlaid on themselves around the treated liquid collecting pipe 3 in such a manner that the respective permeated liquid passage conduits 9 communicate with and discharger treated fluid into the holes 2 of the treated liquid collecting pipe 3.

FIG. 2 is a schematic vertical sectional view showing a reverse osmosis membrane unit used in the conventional reverse osmosis membrane apparatus shown in FIG. 1. In FIG. 2, the reverse osmosis membrane unit 10 consists of a first reverse osmosis membrane 7, a second reverse osmosis membrane 8 and a permeated liquid passage conduit 19 provided between these reverse osmosis membranes. The permeated liquid passage retainer 19 is made from a knitted single tricot fabric. The permeated liquid passage conduit 19 has projections 12 and depressions (grooves) 13 formed alternately at constant intervals on the upper surface. The grooves form main channels for flow of the treated liquid.

FIG. 3 is a schematic vertical sectional view showing the deformation of the reverse osmosis membrane 7 caused at a high pressure in the conventional reverse osmosis membrane unit shown in FIG. 2. In FIG. 3, the raw liquid flows above the first reverse osmosis membrane 7 and below the second reverse osmosis membrane 8, and partially permeates the reverse osmosis membranes 7 and 8 to reach the permeated liquid passage formed by the permeated liquid passage conduit 19. In this case, if the raw liquid is supplied at a high pressure, the first reverse osmosis membrane 7 located on the regularly rugged surface of the permeated liquid passage conduit 19 is partially depressed into the grooves 13, and is deformed. The pressure acting on the first reverse osmosis membrane 7 is indicated by arrows 14, and the pressure acting on the second reverse osmosis membrane 8, by arrows 15. The deformation of the first reverse osmosis membrane 7 closes the grooves 13 which are main for the flow of the permeated liquid. Furthermore, the deformation damages the first reverse osmosis membrane 7 itself, and lowers the performance of the reverse osmosis membrane such as the flow rate of the permeated liquid, the rejection, and the concentration rate.

FIG. 4 is a schematic vertical sectional view showing a conventional reverse osmosis membrane unit used at a high pressure. This conventional reverse osmosis membrane unit 20 is designed to prevent the depression of the reverse osmosis membrane into the grooves. In the reverse osmosis membrane unit 20, a 70 to 400 $\mu$m thick perforated polyester sheet 22 having small holes 21 of 50 to 1000 $\mu$m in diameter at intervals of about 0.1 to 200 mm is provided between the first reverse osmosis membrane 7 and the surface with the grooves 13 of the permeated liquid passage conduit 19 formed by a single tricot, to prevent the deformation of the first reverse osmosis membrane 7 by its depression into the grooves at a high pressure and to lessen the flow resistance of the permeated liquid in the grooves 13. This attempt is proposed in Japanese Patent Laid-Open (Kokai) No. 54-31087. The conventional reverse osmosis membrane unit 20 has the above mentioned problem.

Figure 5:
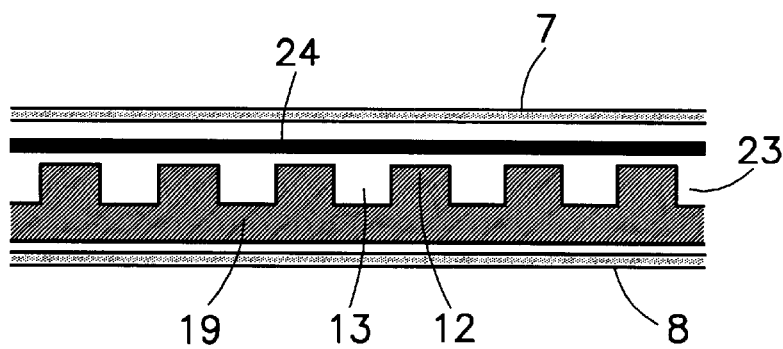
FIG. 5 is a schematic vertical sectional view showing an embodiment of the reverse osmosis membrane unit of the present invention.

FIG. 5 is a schematic vertical sectional view showing an embodiment of the reverse osmosis membrane unit of the present invention. In FIG. 5, the reverse osmosis membrane unit 23 consists of a first reverse osmosis membrane 7, a second reverse osmosis membrane 8, the liquid passage conduit 19 having projections 12 and grooves 13, and a water permeable fabric 24. The permeated liquid passage conduit 19 is located between the first reverse osmosis membrane 7 and the second reverse osmosis membrane 8, and the water permeable fabric 24 is located between the regularly rugged and grooved surface of the permeated liquid passage conduit 19 and the first reverse osmosis membrane 7. This is the basic structure of the reverse osmosis membrane unit of the present invention.

It is preferable that the permeated liquid passage conduit 19 has grooves 13 at least on one surface as shown in FIG. 5, and is made from a woven or knitted fabric.

The grooves 13 are not especially limited in width, depth or density. They are only required to assure a sufficiently low flow resistance for the permeated liquid and to be able to sufficiently support the water permeable fabric 24 provided on the surface at a high pressure.

It is preferable that the width of the grooves 13 of the permeated liquid passage conduit 19 is in a range of 100 to 200 $\mu$m to inhibit the depression of the reverse osmosis membrane 7 into the grooves 13 at a high pressure. A more preferable range is 100 to 150 $\mu$m.

Usually the reverse osmosis membrane 7 used for the reverse osmosis unit 23 has a thickness of about 200 to 300 $\mu$m, and if the width of the grooves 13 is as large as or smaller than the thickness of the reverse osmosis membrane 7, the reverse osmosis membrane 7 is substantially not depressed into the grooves 13.

It is preferable that the width of the grooves 13 is 100 $\mu$m or more. If the width is less than 100 $\mu$m, the flow resistance of the permeated liquid becomes large.

It is preferable that the depth of the grooves 13 is 50 $\mu$m or more. If the depth is less than 50 $\mu$m, the passage of the permeated liquid becomes small, and slight deformation of the reverse osmosis membrane 7 at a high pressure is very likely to greatly change the flow resistance. It is preferable that the depth of the grooves 13 is 200 μm or less. If the depth is more than 200 μm, the thickness of the permeated liquid passage conduit 19 becomes large, and reduces the packed membrane area of the reverse osmosis membranes 7 and 8 small when the permeated liquid passage conduit 19 is installed in the reverse osmosis membrane apparatus.

So, it is preferable that the depth of the grooves 13 is in a range of 50 to 200 μm, to secure a sufficient passage for the permeated liquid and to lessen the flow resistance of the permeated liquid. A more preferable range is 80 to 150 μm.

The flow resistance of the permeated liquid passage conduit 19 depends on the density of grooves 13, i.e., the number of grooves 13 per unit length as described before. In the reverse osmosis membrane unit of the present invention, it is preferable that the density of grooves 13 on one side of the permeated liquid passage conduit 19 is in a range of 45 to 70 grooves per inch. A more preferable range is 50 to 60 grooves per inch.

If the density of grooves 13 is less than 45 grooves per inch, the number of permeated liquid channels becomes small, and lessens the passage area of the entire permeated liquid passage formed by the permeated liquid passage conduit 19, raising the flow resistance. If the density of grooves 13 is higher, the flow resistance can be desirably made smaller. However, if the density of grooves 13 exceeds 70 grooves per inch, the width of the projections 12 of the permeated liquid passage conduit 19 for supporting the reverse osmosis membrane 7 at a high pressure becomes small, and lessens the area of the portions receiving the pressure. As a result, the permeated liquid passage conduit 19 itself is deformed, and the depth of the grooves 13 is likely to be lessened to increase the flow resistance.

The kind of woven or knitted fabric of the permeated liquid passage conduit 19 is not especially limited, provided as the above mentioned structural features are satisfied. However, in view of high quality and low cost production, the use of a knitted tricot fabric is preferable. A knitted tricot fabric is available in many kinds such as double denbigh and queens cord in reference to differences of knitting systems, but any knitting system can be adopted provided the knitted fabric allows the permeated liquid passage to be secured and is unlikely to be deformed.

The material of the fibers constituting the woven or knitted fabric of the permeated liquid passage conduit 19 can be any material as far as it allows the form of the passage conduit 19 to be kept and minimizes dissolution of its ingredients into the permeated liquid. Materials which can be used here include, for example, polyamide fibers, polyester fibers, polyacrylonitrile fibers, polyolefin fibers, polyvinyl chloride fibers, polyvinylidene chloride fibers, polyfluoroethylene fibers, carbon fibers, etc. Considering the strength capable of withstanding a high pressure and the processability of the woven or knitted fabric described later, etc., the use of polyester fibers is preferable.

To prevent the deformation of the permeated liquid passage conduit 19 at a high pressure, it is preferable to treat the woven or knitted fabric by using a hardening treatment, to raise its rigidity. The hardening treatment can be effected, for example, by impregnating the woven or knitted fabric with melamine or epoxy resin, or heating the woven or knitted fabric, to fuse and solidify the fibers together by heat fusion.

Furthermore, to prevent the water permeable fabric 24 and the reverse osmosis membranes 7 and 8 from being locally or unevenly deformed, the woven or knitted fabric of the permeated liquid passage conduit 19 can be calendered. The calendering crushes the fine roughness of the woven or knitted fabric attributable to the form of fibers, for making the fabric very smooth and flat. So, the water permeable fabric 24 and the reverse osmosis membranes 7 and 8 are not deformed unevenly at a high pressure, improving their performance and durability.

It is preferable that the average surface roughness Rz of the water permeable-fabric 24 is 20 μm or less. More preferable is 15 μm or less. The average surface roughness Rz can be obtained by obtaining a sectional curve showing the sectional form of the fabric 24, drawing a straight line parallel to the average line of the section and not intersecting the sectional curve, measuring the vertical distances from the straight line to the crests and troughs of the sectional curve, and obtaining the difference between the average distance of the highest to 5th crests and the average distance of the lowest to 5th troughs. It is preferable that the average surface roughness is 2 μm or more.

To achieve the desirable average surface roughness Rz, it is recommended to calender the fabric for making its surface smooth. If the surface of the fabric is made smooth, damage to the reverse osmosis membrane 7 caused by the surface roughness of the fabric 24 can be decreased, and improves its durability.

As the calendering conditions, for example in the case of polyester fibers, it is preferable that the heating temperature is 50 to 150° C., and that the load per 1 m width is 20 to 80 tons, and it is more preferable that the heating temperature is 60 to 100° C., and that the load per 1 m width is 40 to 60 tons. For fibers of other materials than polyester fibers, the calendering conditions are properly changed in reference to the differences in physical properties such as melting point and elasticity.

The water permeability of the water permeable fabric 24 is decided in reference to the pure water permeability coefficient at 25° C. It is preferable that the permeability coefficient is 0.5 m$^3$/(m$^2$.MPa.min) or more. If the permeability coefficient is less than 0.5 m$^3$/(m$^2$.MPa.min), the flow resistance acting when the permeated liquid permeates the water permeable fabric 24 becomes large, and the permeated liquid is unlikely to flow smoothly into the grooves 13, to increase the pressure on the permeated liquid side of the reverse osmosis membrane 7. So, the effective differential pressure between the supplied liquid side and the permeated liquid side of the reverse osmosis membrane 7 declines to lower the performance of the reverse osmosis membrane unit 23. It is preferable that the permeation coefficient is 5.0 m$^3$/(m$^2$.MPa.min) or less. If the permeation coefficient exceeds the value, the strength of the fabric 24 declines.

To more preferably manifest the performance of the reverse osmosis membrane unit 23 at a high pressure, it is more preferable that the permeation coefficient is 1.0 m$^3$/(m$^2$.MPa.min) to 4.0 m$^3$/(m$^2$.MPa.min).

If the thickness of the water permeable fabric 24 is too small, the rigidity declines, and the fabric is deformed at a high pressure. If the thickness is too large, the thickness of the permeated liquid passage is too large, and the reverse osmosis membrane area obtained when the reverse osmosis membrane unit 23 is installed in the reverse osmosis membrane apparatus decreases disadvantageously though the rigidity is good. It is preferable that the thickness is in a range of 50 to 200 μm, and a more preferable range is 70 to 150 μm.

The material of the fibers constituting the water permeable fabric 24 is only required to satisfy that the water permeable fabric 24 is unlikely to be deformed by the pressure and that the ingredients of the fibers are less dissolved into the permeated liquid. Materials which can be used here include polyamide fibers, polyester fibers, polyacrylonitrile fibers, polyolefin fibers, polyvinyl chloride fibers, polyvinylidene chloride fibers and polyfluoroethylene fibers.

For the water permeable fabric 24, various structures with desired water permeability, surface smoothness and rigidity can be used. It is preferable that the water permeable fabric 24 is a nonwoven fabric, since a fabric with desired water permeability, surface smoothness and rigidity can be easily obtained.

A nonwoven fabric generally has a structure in which short fibers of several millimeters to several centimeters in length are entangled with each other complicatedly. By selecting the density of fibers and post-processing, various nonwoven fabrics are produced ranging from a liquid impermeable nonwoven fabric without any clearance between fibers in a dense texture to a liquid highly permeable nonwoven fabric with many clearances between fibers. The nonwoven fabric used in the present invention must have enough water permeability to smoothly introduce the liquid flowing from the reverse osmosis membrane 7 into the grooves 13.

A nonwoven fabric can generally be produced as a nonwoven fabric in which fibers are oriented at random, or a nonwoven fabric in which fibers are oriented substantially in a certain direction, or a nonwoven fabric with intermediate conditions between both the foregoing types. It is preferable that the nonwoven fabric 24 used in the present invention has fibers oriented substantially in a certain direction.

Furthermore, when the nonwoven fabric 24 with fibers oriented substantially in a certain direction is arranged on the permeated liquid passage conduit 19, it is preferable that the direction of oriented fibers is substantially perpendicular to the direction of the grooves 13 of the permeated liquid passage conduit 19.

If the fibers of the nonwoven fabric 24 are oriented in a certain direction, the nonwoven fabric 24 is anisotropic in strength and rigidity and resists deformation such as bending and, deflection. The fabric is stronger in the direction perpendicular to the direction of oriented fibers than in the direction parallel to the direction of oriented fibers. So, if the direction of oriented fibers of the nonwoven fabric 24 is substantially perpendicular to the direction of grooves 13, deformation of and depression into grooves 13 at a high pressure by the nonwoven fabric 24 can be inhibited.

As described before, the reverse osmosis membrane 7 usually has a substrate deformed of a fabric such as taffeta or nonwoven fabric. It is not preferable to use the substrate also as the water permeable fabric 24. The water permeable fabric 24 is provided for preventing the depression of the reverse osmosis membrane 7 into the grooves 13, and if the substrate is used also as the water permeable fabric 24, the substrate must be thicker.

It is not preferable either that the substrate and the water permeable fabric 24 are integrated beforehand when the reverse osmosis membrane is formed. The integration makes the thickness larger and raises the rigidity, and it becomes difficult to wind the reverse osmosis membrane spirally. For the same reason, it is not preferable to integrate both the substrate of the reverse osmosis membrane and the water permeable fabric 24 by bonding, etc. when the reverse osmosis membrane is wound spirally.

The present invention is characterized in that the water permeable fabric 24 is located between the permeated liquid passage conduit 19 and the first reverse osmosis membrane 7. Therefore, as the structural members other than the water permeable fabric 24, such as the treated liquid collecting pipe, reverse osmosis membranes, permeated liquid passage conduit and supplied liquid passage conduit, those conventionally known can be used.

The service conditions of the reverse osmosis membrane apparatus of the present invention are not especially limited, but when the supplied liquid has a high pressure, the effect of the present invention can be preferably manifested. It is preferable that the pressure (working pressure) applied to the reverse osmosis membranes 7 and 8 is 5 to 15 MPa. A more preferable range is 7 to 12 MPa.

The application of the reverse osmosis apparatus is not limited either. However, since the effect can be manifested at a high pressure, the reverse osmosis membrane apparatus can be preferably used for separating or concentrating a liquid with a high osmotic pressure, for example, for concentrating fruit juice or for desalinating sea water. Especially in the desalination of sea water, in the case of two-stage method for recovering fresh water in a downstream reverse osmosis apparatus from the water concentrated in an upstream reverse osmosis membrane apparatus, the reverse osmosis membrane apparatus of the present invention can be preferably used as the downstream reverse osmosis membrane apparatus since a very high pressure acts on the downstream reverse osmosis membrane apparatus.

EXAMPLES

Example 1 and Comparative Example 1

As Example 1 of the present invention, a polyester multifilament was knitted in double denbigh (yarn diameter 60 denier, 30 wales/inch and 50 courses/inch), and the knitted fabric was hardened by heat fusion (by treating at 250° C. for 1 minute), and calendered (at 60° C. at a load of 50 tons/m), to produce a 200 $\mu$m thick single tricot with forty 200 $\mu$m wide 150 $\mu$m deep grooves 13 per inch on one side and with smooth projections 12 for use as a permeated liquid passage conduit 19.

A nonwoven fabric composed of short polyester fibers was calendered (at 60° C. at a load of 40 tons/m), to produce a 100 $\mu$m thick water permeable fabric 24 with an average surface roughness Rz of 5 $\mu$m and with a pure water permeation coefficient of 0.9 m$^3$/(m$^2$.MPa.min) at 25° C.

The water permeable nonwoven fabric 24 was arranged on the regularly grooved surface of the permeated liquid passage conduit 19 in such a manner that the direction of oriented fibers of the fabric might be substantially perpendicular to the direction of the grooves 13 of the permeated liquid passage conduit 19. The conduit 19 and fabric 24 were installed between two reverse osmosis membranes 7 and 8, to form a reverse osmosis membrane unit with a structure as shown in FIG. 5. It was used as a sample for measuring the flow resistance.

As Comparative Example 1, the same single tricot as obtained in Example 1 was used, for the permeated liquid passage conduit 19 and without arranging any water permeable nonwoven fabric on the regularly grooved surface of the single tricot, with permeated liquid passage conduit 19, it was installed between the two reverse osmosis membranes 7 and 8 as described in Example 1, to form a reverse osmosis membrane unit 10 as shown in FIG. 2. It was used as a sample for measuring the flow resistance.

Pure water at 25° C. was supplied to the reverse osmosis membranes 7 and 8 of each sample at hydrostatic pressures of 0.5 to 10 MPa, and one hour later, the flow resistance of pure water passed through the permeated water passage conduit 19 was measured. The results are shown in Table 1.

TABLE 1

| Pressure(MPa) | Flow resistance (MPa/m³ · day) | |
|---|---|---|
| | Example 1 | Comparative Example 1 |
| 0.5 | 0.28 | 0.32 |
| 1.0 | 0.30 | 0.38 |
| 2.0 | 0.35 | 0.51 |
| 3.0 | 0.39 | 0.59 |
| 4.0 | 0.43 | 0.68 |
| 5.0 | 0.48 | 0.78 |
| 7.0 | 0.57 | 1.07 |
| 10.0 | 0.69 | 1.40 |

In the conventional reverse osmosis membrane unit 10 of Comparative Example 1, the flow resistance sharply increased with the increase of pressure. In the reverse osmosis membrane unit 23 of the present invention, sufficient permeated liquid passage could be secured even at a high pressure, and even at a pressure of 10 MPa, the flow resistance could be controlled to about 2.5 times that at a low pressure. Example 2, and Comparative Examples 2 and 3.

The reverse osmosis membrane unit of Example 2 of the present invention used the same single tricot for the permeated liquid passage conduit 19 and water permeable fabric 24 as obtained in Example 1. The reverse osmosis membrane unit 20 of Comparative Example 2 had the structure shown in FIG. 4, in which a 100 μm thick polyester sheet 22 with small holes of 400 μm in diameter formed at 10 mm intervals was provided on the grooved surface of the same single tricot for the permeated liquid passage conduit 19 as obtained in Example 1. The reverse osmosis membrane unit 23 of Comparative Example 3 used the same permeated liquid passage conduit 19 as used in Example 2, but the water permeable nonwoven fabric 24 had a pure water permeation coefficient of 0.3 m³/(m².MPa.min) at 25° C.

These reverse osmosis modules were wound around respectively different FRP liquid collecting pipes 3 (see FIG. 1), to obtain three reverse osmosis membrane apparatuses with an outer diameter of 4 inches.

Figure 6:
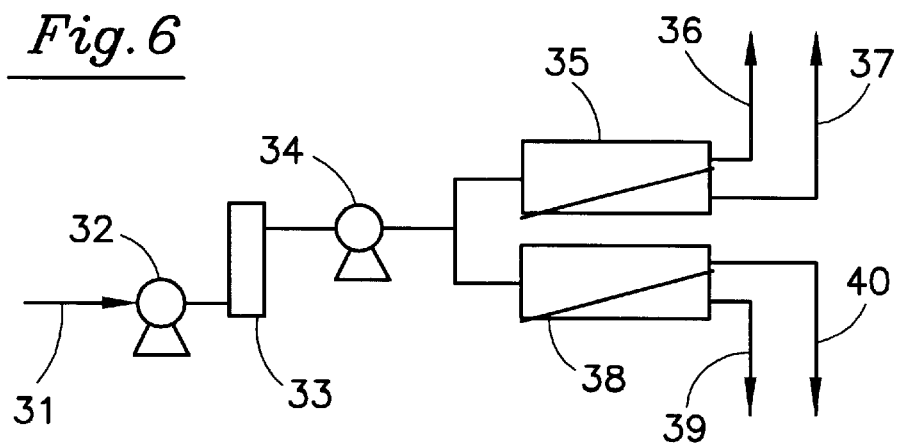
FIG. 6 is a schematic chart showing a system for executing the method of the present invention for producing a separated liquid using a reverse osmosis membrane apparatus.

They were compared in performance using the separated liquid producing system shown in FIG. 6. In the separated liquid producing system, a raw liquid (salt water) supply line 31 is connected to reverse osmosis membrane apparatus housings 35 and 38. In the supply line 31, a supply pump 32, a filter 33 and a high pressure pump 34 are installed upstream of the housings. From the reverse osmosis membrane apparatus housing 35, a concentrate line 36 and a permeated liquid line 37 come out. From the reverse osmosis membrane apparatus housing 38, a concentrate line 39 and a permeated liquid line 40 come out. Any of said three reverse osmosis membrane apparatuses was installed in both the reverse osmosis membrane apparatus housings 35 and 38, to prepare three test lines.

As the raw liquid, salt water was supplied into the test line from the supply line 31. The salt content of the salt water was 5.0%, and the working pressure of the reverse osmosis membranes was changed in a range of 8 to 13 MPa. The salt water was supplied at a flow rate of 20 liters/min, and the temperature of the salt water was 25° C. Salt rejection and water permeate flow after 120 hours were measured at each working pressure. The results are shown in Table 2.

The reverse osmosis membrane unit of Comparative Example 2 sharply declined in salt rejection rate at working pressures of 10 MPa and more. Also when it was evaluated for a long time at a low pressure, the salt rejection rate declined. The reverse osmosis membrane unit of the present invention did not decline in salt rejection rate up to a working pressure of 13 MPa. Furthermore, also in long-time evaluation, the salt water elimination rate did not decline, showing that the reverse osmosis membrane unit of the present invention was more durable than that of Comparative Example 2. The reverse osmosis membrane unit of Comparative Example 3 was smaller in water production than that of the present invention at every working pressure.

TABLE 2

| Pressure (MPa) | Example 2 | Comparative Example 2 | Comparative Example 3 |
|---|---|---|---|
| | Salt rejection rate (%) | | |
| 5.5 | 99.60 | 99.58 | 99.58 |
| 7.0 | 99.65 | 99.61 | 99.57 |
| 8.0 | 99.68 | 99.65 | 99.58 |
| 9.0 | 99.73 | 99.69 | 99.60 |
| 10.0 | 99.78 | 99.50 | 99.62 |
| 11.0 | 99.80 | 99.21 | 99.62 |
| 12.0 | 99.81 | 99.84 | 99.60 |
| 13.0 | 99.82 | 99.33 | 99.60 |
| | Water permeate flow (m³/day) | | |
| 5.5 | 3.12 | 3.18 | 2.88 |
| 7.0 | 3.25 | 3.28 | 2.99 |
| 8.0 | 3.50 | 3.55 | 3.20 |
| 9.0 | 3.68 | 3.71 | 3.37 |
| 10.0 | 3.81 | 3.84 | 3.56 |
| 11.0 | 3.98 | 4.02 | 3.78 |
| 12.0 | 4.16 | 4.23 | 3.98 |
| 13.0 | 4.33 | 4.42 | 4.21 |

What is claimed is:

1. A reverse osmosis membrane element, comprising a reverse osmosis membrane, a permeated liquid passage conduit provided in a facing relationship on one surface of said reverse osmosis membrane, and a water permeable fabric interposed between said reverse osmosis membrane and said permeated liquid passage conduit, said permeated liquid passage conduit having a surface structure comprising a plurality of alternating unidirectionally oriented projections and grooves having a structural strength to resist deformation in use at a high liquid pressure, said grooves having a width of 100 to 200 μm thereby inhibiting depression of said reverse osmosis membrane into said grooves at a high pressure, and having a depth of 50 to 200 μm to achieve decreased fluid flow resistance in said grooves, and said grooves having a density of 45 to 70 grooves per inch of length of said reverse osmosis membrane, wherein the water permeable fabric is a nonwoven fabric, wherein said nonwoven fabric is composed of a multiplicity of single fibers or filaments that are oriented substantially in the same direction, and in a direction substantially perpendicular to the orientation of said grooves of said permeated liquid passage conduit, and wherein the strength of said nonwoven fabric is substantially about 3 to 5 times stronger in a direction parallel to the direction of the oriented fibers or filaments than in a direction perpendicular thereto.

2. A reverse osmosis membrane element, according to claim 1, wherein the water permeable fabric has an average surface roughness Rz of 2–20 μm.

3. A reverse osmosis membrane element, according to claim 1, wherein the water permeable fabric has a pure water permeation coefficient of 0.5–5.0 m³/(m².MPa.min) at 25° C.

4. A reverse osmosis membrane element, according to claim 1, wherein the water permeable fabric has a pure water permeation coefficient of 1.0–4.0 m$^3$/(m$^2$.MPa.min) at 25° C.

5. A reverse osmosis membrane element, according to claim 1, wherein said grooves on the surface of said conduit are arranged in a common direction and disposed to face said water permeable fabric, and wherein said direction of said oriented single filaments of said nonwoven fabric is substantially perpendicular to said direction of said grooves.

6. A reverse osmosis membrane element according to claim 1, wherein said single fibers or filaments have a thickness in the range of several to tens of millimeters.

7. A reverse osmosis membrane unit comprising a reverse osmosis membrane element according to claim 1 combined with a second reverse osmosis membrane with said permeated liquid passage conduit provided between said reverse osmosis membranes.

8. A reverse osmosis membrane element according to claim 1, wherein said permeated liquid passage conduit comprises a woven knitted fabric.

9. A reverse osmosis membrane element according to claim 8, wherein said woven/knitted fabric is hardened.

10. A reverse osmosis membrane element according to claim 8, wherein said woven/knitted fabric is calendered.

11. A reverse osmosis membrane element according to claim 1, wherein said permeated liquid passage conduit comprises a knitted tricot fabric.

12. A reverse osmosis membrane element according to claim 1, wherein a fabric for said permeated liquid passage conduit is selected from the group consisting of polyamide, polyester, polyacrylonitrile, polyolefin, polyvinyl chloride, polyvinylidene chloride, polyfluoroethylene, or carbon.

13. A reverse osmosis membrane element according to claim 1, wherein said water permeable fabric has an average surface roughness Rz in the range of 2–15 μm.

14. A reverse osmosis membrane element according to claim 1, wherein said water permeable fabric is calendered.

15. A reverse osmosis membrane element according to claim 1, wherein said water permeable fabric has a thickness in the range of 50–200 μm.

16. A reverse osmosis membrane element according to claim 1, wherein said water permeable fabric has a thickness in the range of 70–150 μm.

17. A reverse osmosis membrane element according to claim 1, wherein said water permeable fabric is selected from a group consisting of polyamide, polyester, polyacronitrile, polyolefin, polyvinylchloride, polyvinylidene chloride, and polyfluorethylene.

18. A multiple reverse osmosis membrane module comprising the membrane defined in claim 1, further combined with a second reverse osmosis membrane, with said permeated liquid passage conduit provided between said reverse osmosis membranes, and said water permeable fabric of oriented single filaments substantially perpendicular to said conduit and provided between the first reverse osmosis membrane and said permeated liquid passage conduit, and a liquid passage for supplied liquid to be subjected to reverse osmosis treatment, provided outside either or both of said first reverse osmosis membrane or said second reverse osmosis membrane to force said supplied liquid therethrough.

19. A reverse osmosis membrane apparatus comprising a reverse osmosis membrane module according to claim 18 and further comprising a supplied liquid passage conduit provided outside either said first reverse osmosis membrane or said second reverse osmosis membrane or both, and a liquid collecting pipe with a plurality of through holes formed through its pipe wall, wherein said reverse osmosis membrane module is wound around said liquid collecting pipe, with the treated permeated liquid passage conduit connected to said holes of said liquid collecting pipe.

20. A method for producing a separated liquid, in which the reverse osmosis membrane apparatus stated in claim 19 is used, characterized in that a raw liquid is flowed in said supplied liquid passage that the liquid that has permeated the reverse osmosis membrane or membranes is caused to flow in said permeated liquid passage and that said raw liquid is gradually concentrated while it flows in said supplied liquid passage.

21. A method for producing a separated liquid, according to claim 14, wherein the raw liquid is sea water.

22. A method for producing a separated liquid according to claim 20, wherein a working pressure applied to said reverse osmosis membranes is in the range of 5–15 MPa.

23. A method for producing a separated liquid according to claim 20, wherein a working pressure applied to said reverse osmosis membranes is in the range of 7–12 MPa.

24. A method for producing concentrated liquid in which the reverse osmosis membrane apparatus stated in claim 19 is used, characterized in that a raw liquid is flowed in said supplied liquid passage that the liquid that has permeated the reverse osmosis membrane or membranes is caused to flow in said permeated liquid passage and that said raw liquid is gradually concentrated while it flows in said supplied liquid passage.

* * * * *

UNITED STATES PATENT AND TRADEMARK OFFICE
CERTIFICATE OF CORRECTION

PATENT NO. : 6,277,282 B1  Page 1 of 1
APPLICATION NO. : 09/085799
DATED : August 21, 2001
INVENTOR(S) : Kihara et al.

It is certified that error appears in the above-identified patent and that said Letters Patent is hereby corrected as shown below:

In column 1, at line 23, after "and", change "this" to --thus--.

In column 3, at line 12, delete "any" after "and".

Signed and Sealed this

Third Day of October, 2006

JON W. DUDAS
*Director of the United States Patent and Trademark Office*